Figure 1:
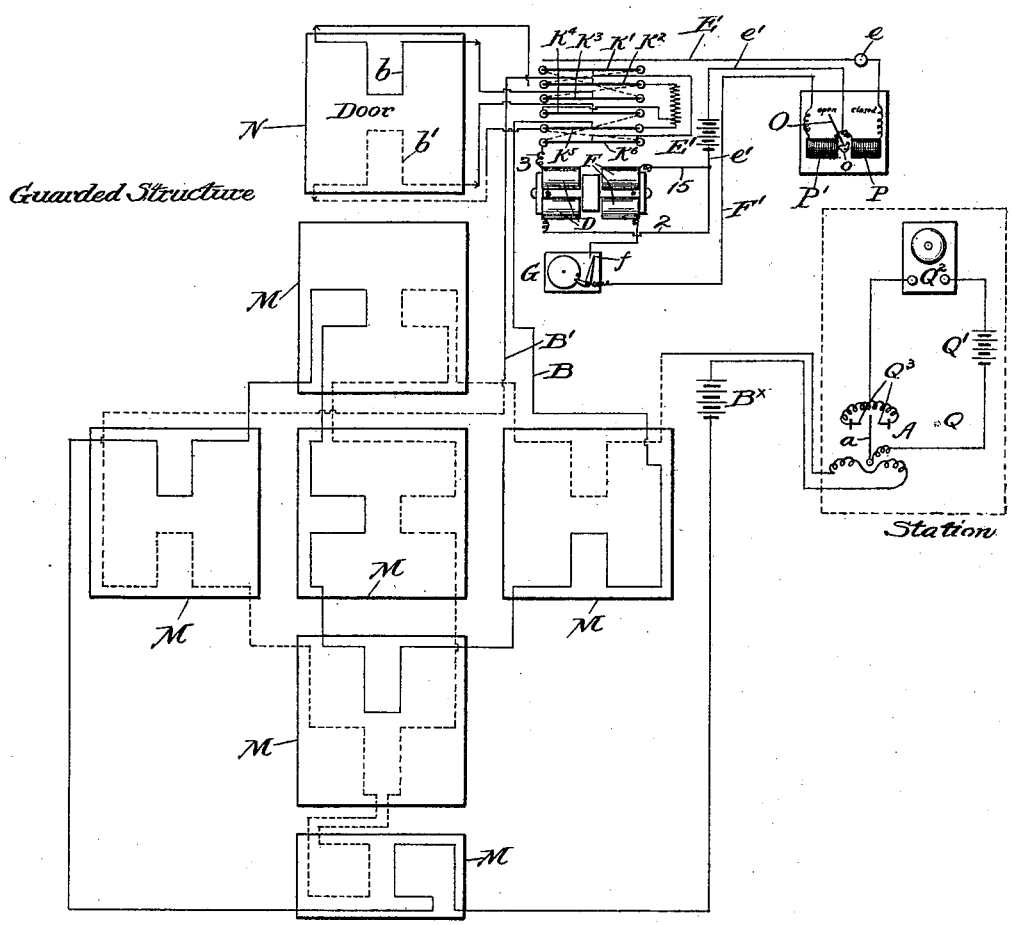

No. 626,670. Patented June 13, 1899.
C. COLEMAN.
ELECTRICAL BURGLAR ALARM.
(Application filed Nov. 10, 1896. Renewed Nov. 28, 1898.)

(No Model.) 5 Sheets—Sheet 1.

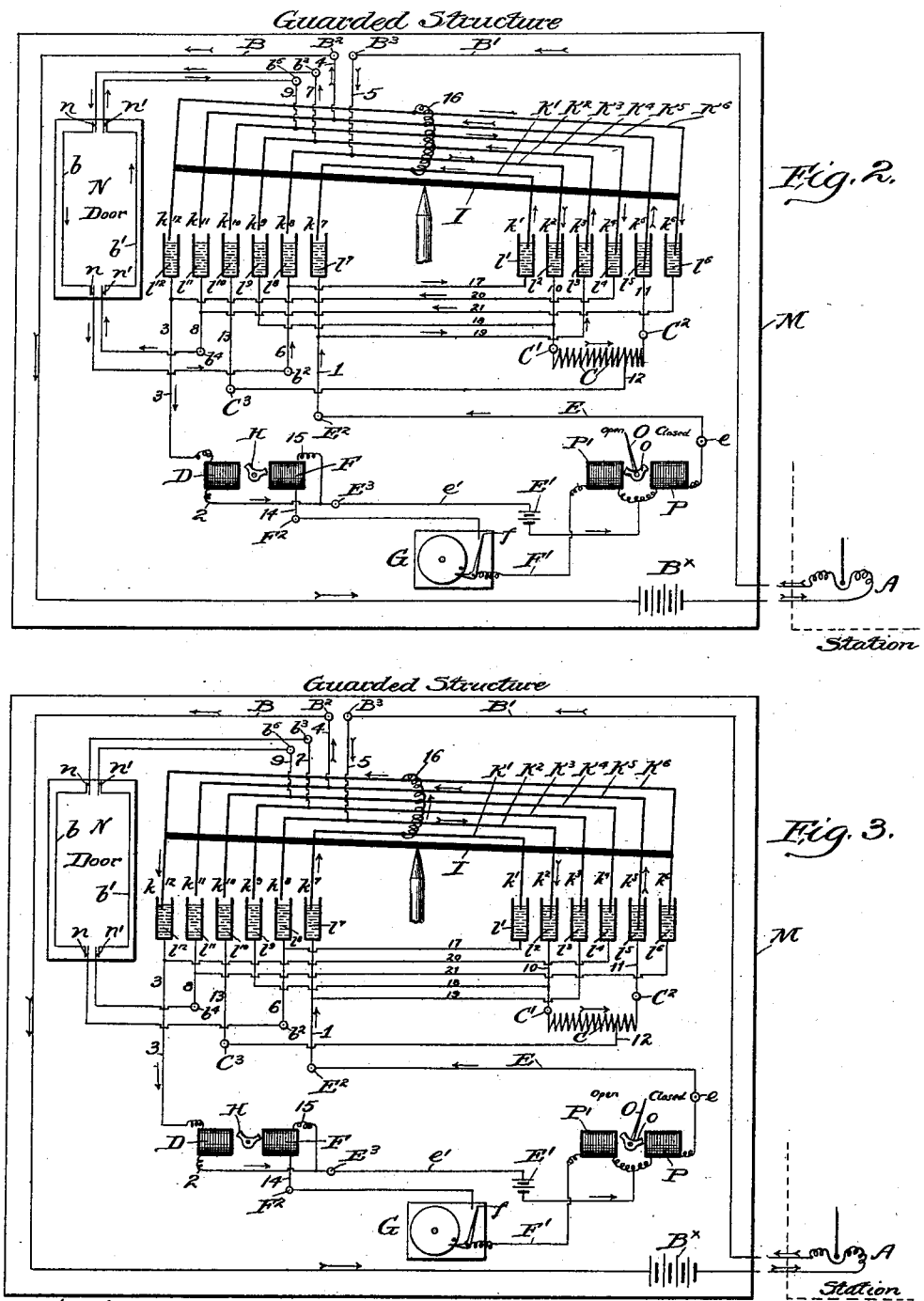

No. 626,670.  
C. COLEMAN.  
ELECTRICAL BURGLAR ALARM.  
(Application filed Nov. 10, 1896. Renewed Nov. 28, 1898.)  
Patented June 13, 1899.

(No Model.) 5 Sheets—Sheet 3.

No. 626,670.  
C. COLEMAN.  
ELECTRICAL BURGLAR ALARM.  
(Application filed Nov. 10, 1896. Renewed Nov. 28, 1898.)  
(No Model.)  
Patented June 13, 1899.  
5 Sheets—Sheet 4.

Witnesses  
Inventor  
Clyde Coleman  
By his attorneys

No. 626,670. Patented June 13, 1899.
C. COLEMAN.
ELECTRICAL BURGLAR ALARM.
(Application filed Nov. 10, 1896. Renewed Nov. 28, 1898.)
(No Model.) 5 Sheets—Sheet 5.

Witnesses
W. C. Corlies
Martin H. Olsen.

Inventor
Clyde Coleman
By his attorneys
Cooley & Hopkins

United States Patent Office.

CLYDE COLEMAN, OF CHICAGO, ILLINOIS, ASSIGNOR, BY MESNE ASSIGNMENTS, OF TWO-THIRDS TO THE BANKERS ELECTRIC PROTECTIVE COMPANY, OF SAME PLACE.

ELECTRICAL BURGLAR-ALARM.

SPECIFICATION forming part of Letters Patent No. 626,670, dated June 13, 1899.

Application filed November 10, 1896. Renewed November 28, 1898. Serial No. 697,709. (No model.)

*To all whom it may concern:*

Be it known that I, CLYDE COLEMAN, a citizen of the United States, residing at Chicago, in the county of Cook and State of Illinois, have invented certain new and useful Improvements in Electrical Burglar-Alarm Systems and in Electrical Switches for Use in Burglar-Alarm and other Systems, of which the following is a specification.

The present invention relates to that class of burglar-alarm systems which have a closed main circuit with which is electrically connected a balanced relay or a galvanometer or some other electrical appliance which will respond to variations in the current passing through the main circuit, all of such appliances being comprehended by the term "responsive device" as herein used. This responsive device may have a needle or other device which will constitute a visible signal, or it may have a part so included in or related to a local circuit that upon a disturbance of the responsive device the local circuit will be either opened or closed and either a visible or an audible signal thereby caused to be given.

The invention is not limited to a signaling device of any particular form or character.

The term "door" as used in this specification is to be interpreted as comprehending all of the equivalents of a door—such, for example, as a window, a screen, a curtain, or any other closure or device for closing an opening—and the term "door-circuit" is to be interpreted as comprehending any circuit in which contacts which are controlled by the door are located, whether any part of said circuit or any of said contacts are actually mounted upon and carried by the door or not.

The invention relates more particularly to that class of burglar-alarm systems in which normally the main circuit is completed through the door-circuit and which have also a shunt around the door-circuit, through which the main circuit may under certain conditions be completed, so that the system may be thrown off of the door while being left on other parts of the guarded structure, to the end that the door may be opened and closed at will during business hours without causing an alarm to be given while other parts of the structure are not without electrical protection.

The principal object of the present invention is to provide a system of this class which has means adapted to be operated manually from the outside of the guarded structure for electrically connecting the door-circuit with the main circuit and at about the same time opening the shunt around the door-circuit, but which has no means at the guarded structure end of the system adapted to be operated manually from the outside of said structure for reëstablishing the main circuit through the shunt, this being left exclusively under the control of mechanism which is inclosed and protected, so as to be inaccessible. Preferably this mechanism includes a chronometer, which is located within the guarded structure itself and which cannot be reached while the door of the structure is closed without giving an alarm.

In its preferred form the system includes a resistance and an electrical barrier made up of two parts of a circuit located upon opposite sides of the resistance, each of said parts being so disposed with relation to the other that a tool penetrating the barrier at any point will break the circuit or else electrically connect it at points located upon opposite sides of the resistance, so as to short-circuit the resistance. Preferably, this barrier is made up of a number of strips of tin-foil arranged in the manner shown and described in Letters Patent No. 616,079, which were issued to me December 20, 1898, and is disposed over all sides of the guarded structure or over such portions thereof as it is desired to protect by the system. Preferably the barrier is disposed upon the door, as well as upon other parts of the guarded structure, and preferably that portion of it that is disposed upon the door constitutes the door-circuit and is provided with contacts so arranged that when the door is closed so much of the barrier as is carried by the door (or, in other words, the door-circuit) may be included in the main circuit, the door-circuit being preferably so divided that when included in the main circuit one half of it will be upon each side of the resistance. The arrangement is such, however, that something more than the simple act of opening the door is necessary in order to cut the door-circuit out of the main circuit and establish the main circuit through the shunt around the door-circuit without giving an alarm, and something more than the simple act of closing the door is necessary in order to include the door-circuit in the main circuit. As before stated, inaccessible automatically-operating mechanism is provided for establishing the main circuit through the shunt around the door-circuit, and mechanism having an exposed part adapted to be manually operated is provided for including the door-circuit in the main circuit and for opening the shunt of the main circuit, and both of these mechanisms include a switch, as hereinafter fully described.

According to the present invention the door-circuit and its contacts are included in and form a part of the circuit (hereinafter called the "manual" switching-circuit) which operates the switch for throwing the door-circuit into the main circuit, and an indicator or annunciator is also included in this manual switching-circuit, so that it will operate only upon a completion of said circuit. Let it be supposed that the operator has closed the door and has pushed the button of the manual switching-circuit for the purpose of throwing the door-circuit into the main circuit. If, perchance, the door is not completely closed or if from any other cause—as, for example, corrosion or an accumulation of dirt—the door-contacts do not close, the manual switching-circuit, which includes these contacts, will not be completed, the magnets which are included in it will not be energized, and the switch and annunciator will not work. From this failure of the annunciator to give the proper indication the operator knows that the circuit has not been established at the door-contacts and the switch has not operated and included the door-circuit in the main circuit. On the other hand, if the contacts are in order the closing of the door will complete the manual switching-circuit everywhere but at its push-button. Hence upon pushing the button the circuit will be closed and the current will pass, energize the annunciator-magnet, and also the magnet for operating the switch which throws the door-circuit into the main circuit. The annunciator indicates that this action has taken place, and the door of the guarded structure may then be locked, after which the door-circuit cannot be thrown out of the main circuit excepting by the action of automatically-operating mechanism already referred to. At the proper time for opening the structure the chronometer will establish a circuit, (hereinafter called a "chronometer" switching-circuit,) and thereby cause a current to pass through a magnet which operates the switch in the reverse direction and throws the door-circuit out of the main circuit and reëstablishes the main circuit through the shunt around the door-circuit. The construction of the switch is such that the main current is never interrupted, one path for it being established before the other is broken.

The invention consists in the features of novelty that are particularly pointed out in the claims hereinafter, and in order that it may be fully understood I will describe it with reference to the accompanying drawings, which are made a part of this specification, and in which—

Figure 6:
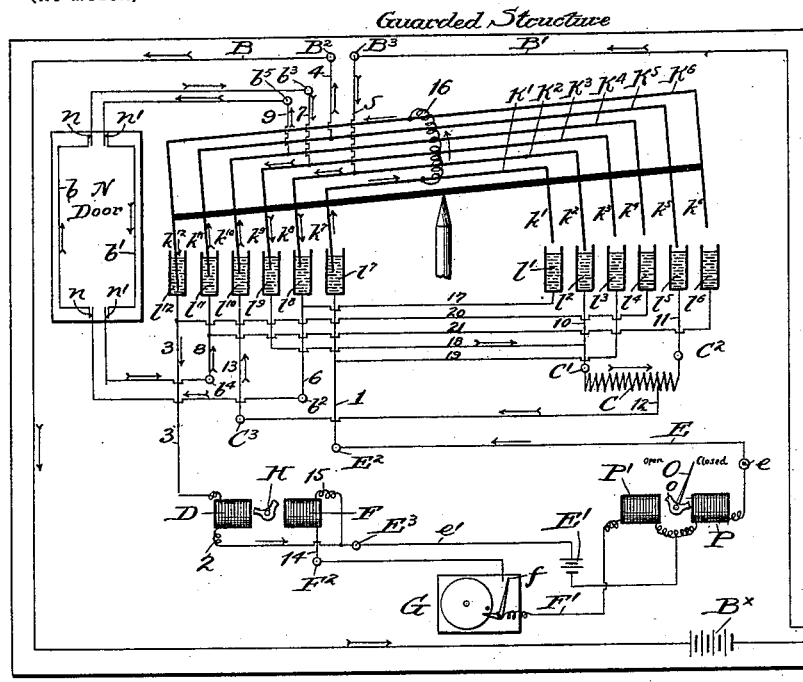
Figure 7:
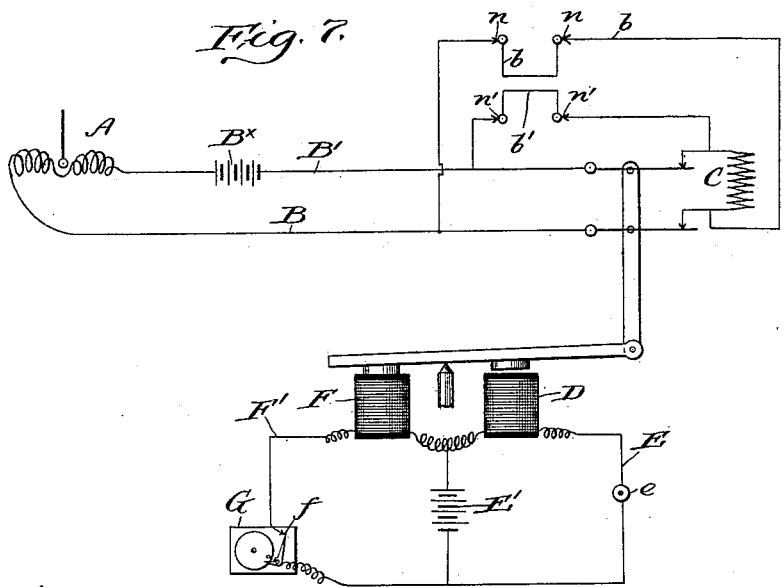
Figure 8:
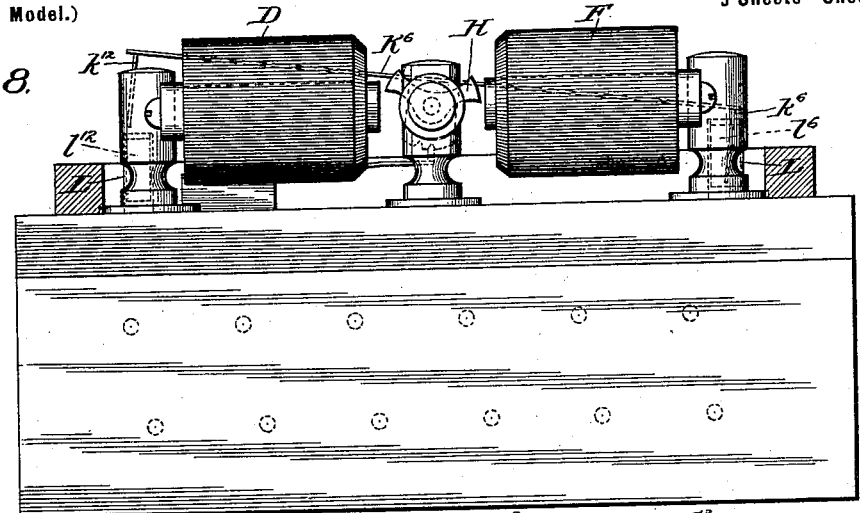
Figure 9:
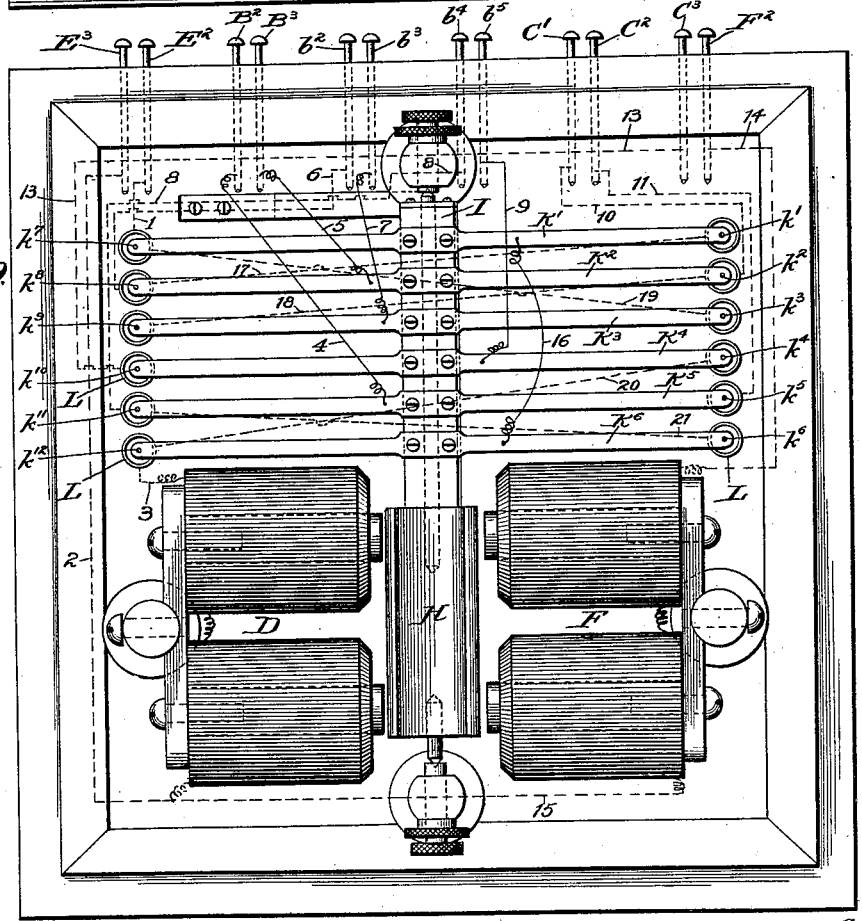

Figures 1 to 6, inclusive, are diagrammatic representations of a burglar-alarm system embodying the invention. Figs. 1 and 2 agree in respect to the positions of the parts and the conditions of the circuits, while 3 to 6, inclusive, show the parts in different positions during the movement of the switch. Fig. 7 is a diagrammatic representation of a burglar-alarm system embodying some features of the invention. Figs. 8 and 9 are respectively an elevation and a plan view of a switch embodying the invention so far as it relates to a switch and adapted for use in a burglar-alarm or other electrical system embodying the invention so far as it relates to such a system.

Referring first to Fig. 7, A represents a responsive device of the class already described, which is located at the station, and B B' represent the two sides of the main circuit, which extend from the station to the guarded structure and are there connected with opposite ends of a resistance C. $b$ $b'$ may represent the two sides of the door-circuit. It will be understood that in the preferred form of the invention at the guarded structure the main circuit is arranged in the form of a barrier, which extends over all portions of the guarded structure (or such portions thereof as it is desired to protect by the system) excepting the door in some such manner as that described in my patent, already referred to, or in any other suitable manner, and the two parts of the door-circuit are preferably arranged upon the door so as to form a barrier. As shown in this figure, the main circuit is complete, and it may be supposed that the door-circuit is also complete, so that there are two paths for the current. If, however, the magnet D be energized, its armature will be attracted, and the switch, hereinafter fully described, will be operated so as to leave the main circuit complete only through the door-circuit. This magnet is included in a circuit E, herein called the "manual" switching-circuit, which circuit is supplied with current from a battery E' and has an exposed push-button $e$ or similar device, this push-button being the only part of all the mechanism located at the guarded structure, with the exception of the pointer of an annunciator, which is accessible from the outside thereof. The switch is also under the control of a magnet F, which when energized causes the door-circuit to be cut out and the main circuit to be established through a shunt around the door-circuit. This magnet F is included in what is herein called the "chronometer" switching-circuit F', which may be supplied with current from the battery E' and includes coöperating contacts $f$, which are normally open and which are adapted to be closed by a chronometer G or other automatically-operating mechanism. This figure is a correct representation of my invention only in that it shows means for completing the main circuit during business-hours without carrying it through the door-circuit, means having an exposed part adapted to be manually operated for including the door-circuit in the main circuit when it is desired to do so, and automatically-operating means for completing the main circuit without including the door-circuit, said means being inaccessible so long as the guarded structure is closed and the door-circuit is included in the main circuit.

It is not intended to fully illustrate that feature of my invention which consists in establishing one path for the current before another path is broken, to the end that the current shall never be interrupted, nor is it intended to illustrate that feature of the invention which consists in including the door-circuit in the manual switching-circuit. All of these features are, however, fully represented in the other figures of the drawings and especially in Figs. 2 to 6, inclusive; but before describing the invention with reference to these figures I will describe the mechanical construction of the switch, which is shown in Figs. 8 and 9. D and F represent the magnets already referred to, and H represents an armature disposed between them and adapted to oscillate, it being of such construction that when one of the magnets is energized the armature is moved in one direction and when the other is energized it is moved in the other direction. Carried by this armature is a part I, so disposed that it partakes of the oscillating movement of the armature. This part is preferably made of hard rubber or some other insulating material, and to it are secured six metallic arms, which project in opposite directions from it and are lettered K' to $K^6$, inclusive, said arms being insulated from each other excepting as hereinafter described. It will be understood that in its broadest aspect the invention is not limited to a switch having precisely this number of arms, but, on the contrary, comprehends a switch of the same general character having either a greater or a less number of arms. The number of arms used in any given instance must be determined by the exigencies of the case and must be left to the discretion of the engineer. Each of these arms carries at each of its ends a depending pin, those upon one side of the center of oscillation being indicated by the letters $k'$ to $k^6$, inclusive, and those upon the other side being indicated by the reference-letters $k^7$ to $k^{12}$, inclusive. Each of these pins constitutes one of a pair of contacts. The coöperating contacts are lettered, respectively, $l'$ to $l^{12}$, inclusive. Each of them consists of a cup L, containing a body of mercury, into which the contact-pins are adapted to dip. The two sides of the manual switching-circuit E are connected to pins $E^2$ and $E^3$, respectively. The pin $E^2$ is connected by a wire 1 with the contact $l^7$, and the pin $E^3$ is connected by a wire 2 with one side of the magnet D, the other side of which is connected by a wire 3 with the contact $l^{12}$. The two sides B B' of the main circuit are connected with pins $B^2$ $B^3$, respectively. The pin $B^2$ is connected by a wire 4 with the switch-arm $K^5$, and the pin $B^3$ is connected by a wire 5 with the switch-arm $K^2$. The two extremities of one side $b$ of the door-circuit are connected to pins $b^2$ $b^3$. The pin $b^2$ is connected by a wire 6 with the contact $l^8$, and the pin $b^3$ is connected by a wire 7 with the switch-arm $K^3$. The two ends of the other side $b'$ of the door-circuit are connected with pins $b^4$ $b^5$. The pin $b^4$ is connected by a wire 8 with the contact $l^{11}$, and the pin $b^5$ is connected by a wire 9 with the switch-arm $K^4$. The opposite ends of the resistance C are connected to pins C' $C^2$. The pin C' is connected by a wire 10 with the contact $l^2$, and the pin $C^2$ is connected by a wire 11 with the contact $l^5$. At an intermediate point a wire 12 connects the resistance with a pin $C^3$, which in turn is connected by a wire 13 with the contact $l^{10}$. From one of the contacts $f$ of the chronometer switch-circuit F' a wire leads to the pin $F^2$, which in turn is connected by a wire 14 with one side of the magnet F, the other side of which is connected by a wire 15 with the wire 2, leading to the pin $E^3$, from which a wire $e'$ leads to the battery E', this wire being common to both the manual switching-circuit and the chronometer switching-circuit. The switch-arms K' $K^6$ are connected by a wire 16. The contacts $l'$ and $l^3$ are connected by a wire 17. The contacts $l^2$ and $l^9$ are connected by a wire 18. The contacts $l^3$ and $l^7$ are connected by a wire 19. The contacts $l^4$ and $l^{12}$ are connected by a wire 20, and the contacts $l^6$ and $l^{11}$ are connected by a wire 21.

Figure 4:
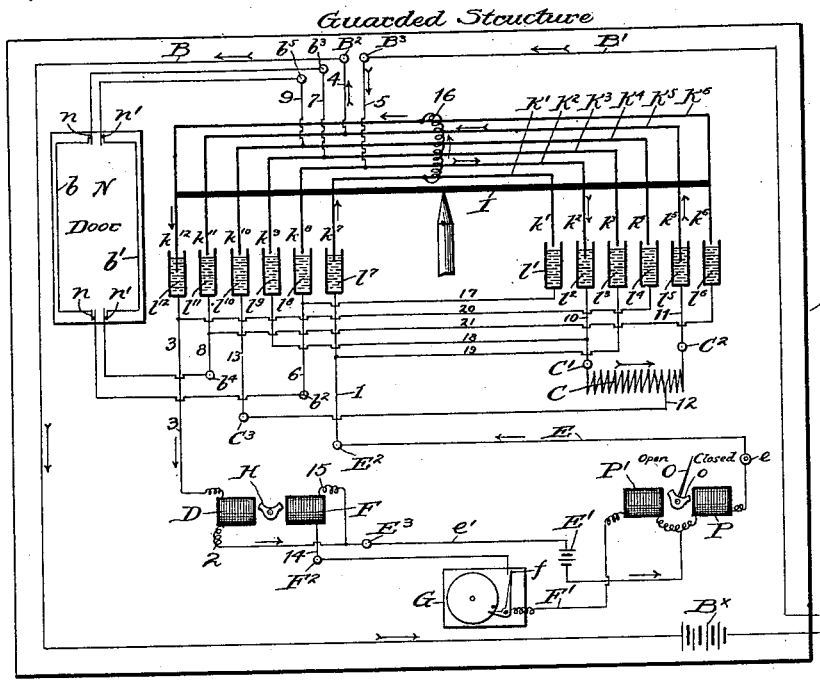
Figure 5:
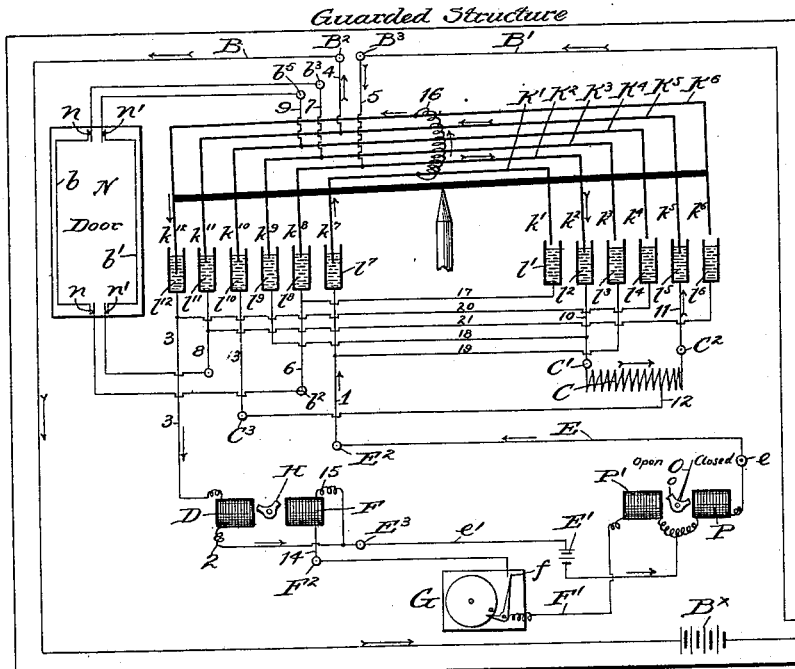

Referring now to Figs. 2 to 5, inclusive, let M represent the guarded structure, which may be a building, a compartment in a building, a vault, a safe, a cabinet inclosing a safe, or any other structure, and let N represent the door thereof, which, it may be supposed, is controlled by the time-lock G. It may also be supposed that the main circuit B B' is disposed over the guarded structure in the manner already described and has its two sides connected with the switch-arms $K^2$ $K^5$ by the wires 5 and 4, respectively. Let it be supposed that contacts $n$ $n'$ are so arranged with relation to the door that when the system is in working order said contacts will be open when the door is open and will be closed when the door is closed. Let it be supposed that the parts are in the positions shown in Figs. 1, 2, 8, and 9 and that the door is open. The main circuit will under these conditions be complete through the wires B' and 5, switch-arm $K^2$, contacts $k^2$ $l^2$, wire 10, resistance C, wire 11, contacts $l^5$ $k^5$, switch-arm $K^5$, wires 4 and B, battery $B^\times$, and the meter A, and thus shunted around the door-circuit. While the switch remains in this position, the door may be opened or closed without in any way affecting the main circuit, since the door-circuit is interrupted at the contacts $k^9$ and $k^{10}$, and thus the alarm may remain on during business hours on all parts of the guarded structure excepting the door. Let it be supposed now that the operator closes the door of the guarded structure and desires to include the door-circuit and its contacts in the main circuit. He pushes the button $e$ of the manual switching-circuit. If from any cause the door-contacts do not close, the manual switching-circuit, which includes these contacts, will remain open, and no current will pass through it. This is indicated by the fact that the needle O of an annunciator fails to move to a position indicating that the manual switching-circuit has been closed. This annunciator has a magnet P included in the manual switching-circuit and a magnet P' included in the chronometer switching-circuit, and its armature $o$ is so disposed with relation to these two magnets that when the magnet P is energized the needle will be thrown to the position shown in Figs. 3 to 6, inclusive, indicating that the manual switching-circuit has been closed at all points and, inferentially, that its function has been performed—i. e., that the switch has been operated. On the other hand, the failure of the needle of the annunciator to move to the position shown in Figs. 3 to 6, inclusive, not only indicates that the manual switching-circuit has not been established, but in addition it indicates other conditions which are attendant upon this failure to establish the manual switching-circuit—viz., that the switching-circuit has not performed its function, and therefore the switch has not operated and included the door-circuit in the main circuit. Let it be supposed, however, that the door-contacts are closed properly and the manual switching-circuit is closed at $e$. The current will then flow through wires E, 1, and 19, contacts $l^3$ $k^3$, switch-arm $K^3$, wire 7, the side $b$ of the door-circuit, including its contacts $n$, wire 6, wire 17, contacts $l'$ $k'$, switch-arm $K'$, wire 16, switch-arm $K^6$, contacts $k^6$ $l^6$, wire 21, wire 8, the side $b'$ of the door-circuit, including its contacts $n'$, wire 9, switch-arm $K^4$, contacts $k^4$ $l^4$, wire 20, and wire 3, to the magnet D and thence back to the battery E'. This causes the armature H to be moved from the position shown in Fig. 2 to the position shown in Fig. 6, and during this movement several changes in the circuits will take place, the successive changes being shown by Figs. 3, 4, 5, and 6, respectively. The first change which takes place (shown in Fig. 3) is the closing of the contacts $k^7$ $l^7$ and $k^{12}$ $l^{12}$. This change does not alter the course of the main circuit, but establishes a new path for the current of the manual switching-circuit. This new path is established before the old one (shown in Fig. 2) is broken and short-circuits the door-circuit. When it is established, the current of the manual switching-circuit will flow through wires E and 1, contacts $l^7$ $k^7$, switch-arm $K'$, wire 16, switch-arm $K^6$, contacts $k^{12}$ $l^{12}$, wire 3, magnet D, and thence back to the battery. The next change which takes place during the movement of the switch shown in Fig. 4 is the opening of the contacts $k'$ $l'$, $k^3$ $l^3$, $k^4$ $l^4$, and $k^6$ $l^6$. This change does not alter the course of the current passing through the main circuit nor does it change the course of the current of the manual switching-circuit from that shown in Fig. 3. It simply breaks the path of the current of the manual switching-circuit which is shown in Fig. 2. The next change which takes place during the movement of the switch shown in Fig. 5 does not alter the path for the current of the manual switching-circuit; but without breaking the above-described path for the current of the main circuit establishes for said current a new path through the door-circuit, which it may take exclusively as soon as the old path through the shunt is broken and will take in part even before it is broken. In other words, without opening the main circuit at the contacts $k^2$ $l^2$ and $k^5$ $l^5$ the door-circuit is looped into the main circuit by closing the contacts $k^8$ $l^8$, $k^9$ $l^9$, $k^{10}$ $l^{10}$, and $k^{11}$ $l^{11}$. This change provides two paths for the current of the main circuit, with the result that the current will divide between them in proportion to their respective resistances. The next and final change which takes place during the movement of the switch shown in Fig. 6 is the breaking of the main circuit at the contacts $k^2$ $l^2$ and $k^5$ $l^5$, or, in other words, through the shunt, with the result that the current of the main circuit will thereafter be compelled to pass through the door-circuit, its course being as follows: wires B' and 5, switch-arm $K^2$, contacts $k^8$ $l^8$, wire 6, side $b$ of the door-circuit and its contacts $n$ $n$, wire 7, switch-arm $K^3$, contacts $k^9$ $l^9$, wire 18, a portion of the resistance C, wires 12 and 13, contacts $l^{10}$ $k^{10}$, switch-arm $K^4$, wire 9, the side $b'$ of the door-circuit, including its contacts $n'$, wire 8, contacts $l^{11}$ $k^{11}$, switch-arm $K^5$, wire 4, and wire B, back to the battery $B^\times$. In taking this course a portion of the resistance is cut out, it being the intention that the portion so cut out shall equal the resistance which is contained in the door-circuit. The successive opening and closing of the several contacts in the order named may be accomplished either by making the contact-pins of different lengths and filling all of the cups L with mercury to the same level, as shown in the drawings, or by making all of the contact-pins of the same length and filling the cups of mercury to different levels, the former being preferred. After the movement of the switch thus described has been completed, the guarded structure being closed, there is absolutely no way to shunt the door-circuit by the manipulation of any exposed part of the system, and consequently the switch will remain in the position shown in Fig. 6 until the chronometer switching-circuit is completed at the contacts $f$ by the automatic action of the chronometer G or some other automatically-operating mechanism which is so set as to complete this circuit at the time it is desired to shunt the door-circuit, to the end that the door may be opened without causing a disturbance of the meter A and the giving of an alarm. Immediately upon the completion of the chronometer switching-circuit its magnet F is energized and moves the switch from the position shown in Fig. 6 back to the position shown in Figs. 1, 2, 8, and 9. The system is thus thrown off of the door, but remains on all other parts of the guarded structure, and this is indicated by a return of the pointer O to the position shown in Figs. 1 and 2.

In Fig. 1 the top, bottom, and four sides of the guarded structure are diagrammatically represented at M and the door at N. In this figure the needle $a$ of the meter is shown as being electrically connected with one side of a local alarm-circuit Q, which includes a battery Q', a magneto-electric bell $Q^2$, and two contacts $Q^3$, between which the needle is disposed in the manner shown and described in my application already referred to.

Having thus described my invention, the following is what I claim as new therein and desire to secure by Letters Patent:

1. In an electrical burglar-alarm system, the combination of a main circuit, a door-circuit, means for electrically connecting the door-circuit with the main circuit, a responsive device electrically connected with the main circuit and adapted to operate upon a disturbance of the door-circuit when the latter is connected with the main circuit, automatically-operating means for establishing for the current a path other than the door-circuit, and means for thereafter preventing a disturbance of the responsive device by a disturbance of the door-circuit, the system being without any means at the guarded structure, accessible from the outside thereof, and adapted to be operated manually, for thus establishing said path other than the door-circuit, substantially as set forth.

2. In an electrical burglar-alarm system, the combination of a main circuit, a door-circuit, means located at the guarded structure and adapted to be operated manually from the outside of said structure for electrically connecting the door-circuit with the main circuit, a responsive device electrically connected with the main circuit and adapted to operate upon a disturbance of the door-circuit when the latter is connected with the main circuit, automatically-operating means for establishing for the current a path other than the door-circuit, and means for thereafter preventing a disturbance of the responsive device by a disturbance of the door-circuit, the system being without any means at the guarded structure, accessible from the outside thereof, and adapted to be operated manually, for thus establishing said path other than the door-circuit, substantially as set forth.

3. The combination with a structure to be guarded, of an electrical burglar-alarm system having a door-circuit, a main circuit having a shunt around the door-circuit, an electrical barrier formed in two parts disposed about the guarded structure and electrically connected with the main circuit, a resistance arranged between the two parts of said barrier, an electrical barrier formed in two parts disposed upon the door and electrically connected with the door-circuit, means for electrically connecting the door-circuit with the main circuit so that the two parts of the barrier upon the door shall be upon opposite sides of the resistance and so that current from the main circuit will pass through the door-circuit and automatically-operating means for establishing the main circuit through the shunt around the door-circuit, so as to leave the main circuit operative and the system in operative condition at the guarded structure while the door is open, substantially as set forth.

4. In an electrical burglar-alarm system, the combination with a door-circuit and a main circuit having a shunt around the door-circuit, of means for electrically connecting the door-circuit with the main circuit, and automatically-operating means disposed within the guarded structure for establishing the main circuit through the shunt around the door-circuit, the system being without any means at the guarded structure accessible from the outside thereof while the system is on, and adapted to be operated manually for rendering the door-circuit inoperative or establishing the shunt, substantially as set forth.

5. In an electrical burglar-alarm system, the combination with a door-circuit including contacts controlled by the door and a main circuit having a shunt around the door-circuit, of means for electrically connecting the door-circuit with the main circuit, said means including a part which is accessible from the outside of the guarded structure and which is adapted to be operated manually, the system being without any means at the guarded structure, accessible from the outside thereof, and adapted to be operated manually, for rendering the door-circuit inoperative, substantially as set forth.

6. In an electrical burglar-alarm system, the combination with a door-circuit and a main circuit having a shunt around the door-circuit, of means for electrically connecting the door-circuit with the main circuit, and automatically-operating means for establishing the main circuit through the shunt around the door-circuit, said automatically-operating means being itself protected by the system so as to be inaccessible, substantially as set forth.

7. In an electrical burglar-alarm system, the combination of a door-circuit, a main circuit having a shunt around the door-circuit, means for electrically connecting the door-circuit with the main circuit, and means for establishing the main circuit through the shunt around the door-circuit, the amount of resistance in the door-circuit and shunt being equal, substantially as set forth.

8. In an electrical burglar-alarm system, the combination of a door-circuit, a main circuit having a shunt around the door-circuit, a switch for electrically connecting the door-circuit with the main circuit, an electromagnet for operating said switch, a circuit including said magnet, and means accessible from the outside of the guarded structure for making and breaking said circuit for operating the switch, substantially as set forth.

9. In an electrical burglar-alarm system, the combination of a door-circuit, a main circuit having a shunt around the door-circuit, a switch for electrically connecting the door-circuit with the main circuit, an electromagnet for operating said switch, a circuit including said magnet, means accessible from the outside of the guarded structure for opening and closing said circuit, a switch for establishing the main circuit through the shunt around the door-circuit, means inaccessible from the outside of the guarded structure for operating said switch, and means connecting the two switches whereby they are compelled to operate reciprocally, substantially as set forth.

10. In an electrical burglar-alarm system, the combination of a door-circuit, a main circuit having a shunt around the door-circuit, a switch for establishing the main circuit through the shunt around the door-circuit, and automatically-operating means located within the protected district for operating said switch, substantially as set forth.

11. In an electrical burglar-alarm system, the combination of a door-circuit, a main circuit having a shunt around the door-circuit, means adapted to be operated from the outside of the guarded structure for electrically connecting the door-circuit with the main circuit, and means located at the guarded structure for indicating upon the outside thereof the connection of the door-circuit with the main circuit, substantially as set forth.

12. In an electrical burglar-alarm system, the combination of a door-circuit, a main circuit having a shunt around the door-circuit, means for electrically connecting the door-circuit with the main circuit, means for opening the shunt, said opening means including an electromagnet located within the guarded structure, a circuit located within the guarded structure and including said magnet, an exposed device located at the guarded structure and adapted to be operated manually for controlling said circuit, the system being without any means at the guarded structure, accessible from the outside thereof, and adapted to be operated manually, for opening the shunt, substantially as set forth.

13. The combination with a structure to be guarded having a door, of an electrical burglar-alarm system having a main circuit, a resistance in the main circuit, a barrier included in the main circuit and arranged in two parts upon opposite sides of the resistance and disposed about the structure to be guarded, a circuit disposed upon the door and having contacts adapted to be controlled by the door, the door-circuit being arranged to form two parts of a barrier, means for including the door-circuit in the main circuit, one-half thereof upon each side of the resistance, and automatically-operating means for cutting the door-circuit out of the main circuit and establishing the main circuit by another path, substantially as set forth.

14. In an electrical burglar-alarm system, the combination of a main circuit, a resistance included in the main circuit, a barrier included in the main circuit and arranged in two parts upon opposite sides of the resistance and disposed about the structure to be guarded, a door-circuit having contacts adapted to be controlled by the door, means for including the door-circuit in the main circuit and at the same time cutting a portion of the resistance out of the main circuit, and automatically-operating means for cutting the door-circuit out of the main circuit and establishing the main circuit by another path including the entire resistance, substantially as set forth.

15. In a burglar-alarm system, the combination with a main circuit and a door-circuit having contacts controlled by the door, of a switch for switching the door-circuit into the main circuit, a switching-circuit including the door-contacts and a magnet arranged upon the switching-circuit for operating the switch, substantially as set forth.

16. In an electrical burglar-alarm system, the combination with a main circuit and a door-circuit having contacts controlled by the door, of a switch for throwing the door-circuit into the main circuit, a switching-circuit including the door-contacts and having a magnet for operating the switch, and an indicator electrically connected with the switching-circuit, substantially as set forth.

17. In an electrical burglar-alarm system, the combination with a main circuit and a door-circuit having contacts controlled by the door, of a switch for throwing the door-circuit into the main circuit, a switching-circuit, including the door-contacts, having a magnet for operating the switch, and an exposed contact device adapted to be manually operated, substantially as set forth.

18. In a burglar-alarm system, the combination with a main circuit and a door-circuit having contacts adapted to be controlled by the door, of a switch for throwing the door-circuit into and out of the main circuit, a manual switching-circuit including the door-contacts and having a magnet adapted when energized to move the switch in one direction and throw the door-circuit into the main circuit, and a chronometer switching-circuit having a magnet for operating the switch in the other direction and throwing the door-circuit out of the main circuit, substantially as set forth.

19. In an electrical burglar-alarm system, the combination with a main circuit and a door-circuit having contacts controlled by the door, of a switch through which the door-circuit is looped into the main circuit, and automatically-operating means for actuating said switch and rendering the door-circuit inoperative, said switch having contacts so arranged that during its movement it first establishes a new path for the current of the main circuit, not including the door-circuit, and subsequently interrupts the old path through the door-circuit, substantially as set forth.

20. In an electrical burglar-alarm system, the combination with a main circuit and a door-circuit having contacts adapted to be controlled by the door, of a switch, a switching-circuit which, in the initial position of the switch includes the door-contacts and a magnet arranged in the switching-circuit for operating the switch, said switch having means whereby as it moves it first establishes a new path for the current of the switching-circuit, then throws the door-contacts out of the switching-circuit and then throws the door-contacts into the main circuit, substantially as set forth.

21. In an electrical burglar-alarm system, the combination with a main circuit, including a resistance, and a door-circuit having contacts controlled by the door, of a switch, a switching-circuit which, in the initial position of the switch includes the door-contacts, and a magnet arranged in the switching-circuit for operating the switch said switch having means whereby as it moves it first establishes a new path for the current of the switching-circuit, then throws the door-contacts out of the switching-circuit, then throws the door-contacts into the main circuit and simultaneously cuts a portion of the resistance out of the main circuit, substantially as set forth.

22. In an electrical burglar-alarm system, the combination with a main circuit and a door-circuit having contacts controlled by the door, of a switch, a switching-circuit which, in the initial position of the switch includes the door-circuit, and a magnet arranged in the switching-circuit for operating the switch, said switch having means whereby as it moves it first establishes a new path for the current of the switching-circuit, then cuts the door-circuit out of the switching-circuit, then throws the door-circuit into the main circuit and then interrupts the path through which the current of the main circuit passed in the initial position of the switch, substantially as set forth.

CLYDE COLEMAN.

Witnesses:
L. M. HOPKINS,
JAS. W. DONNELL.